United States Patent Office
3,467,308
Patented Sept. 16, 1969

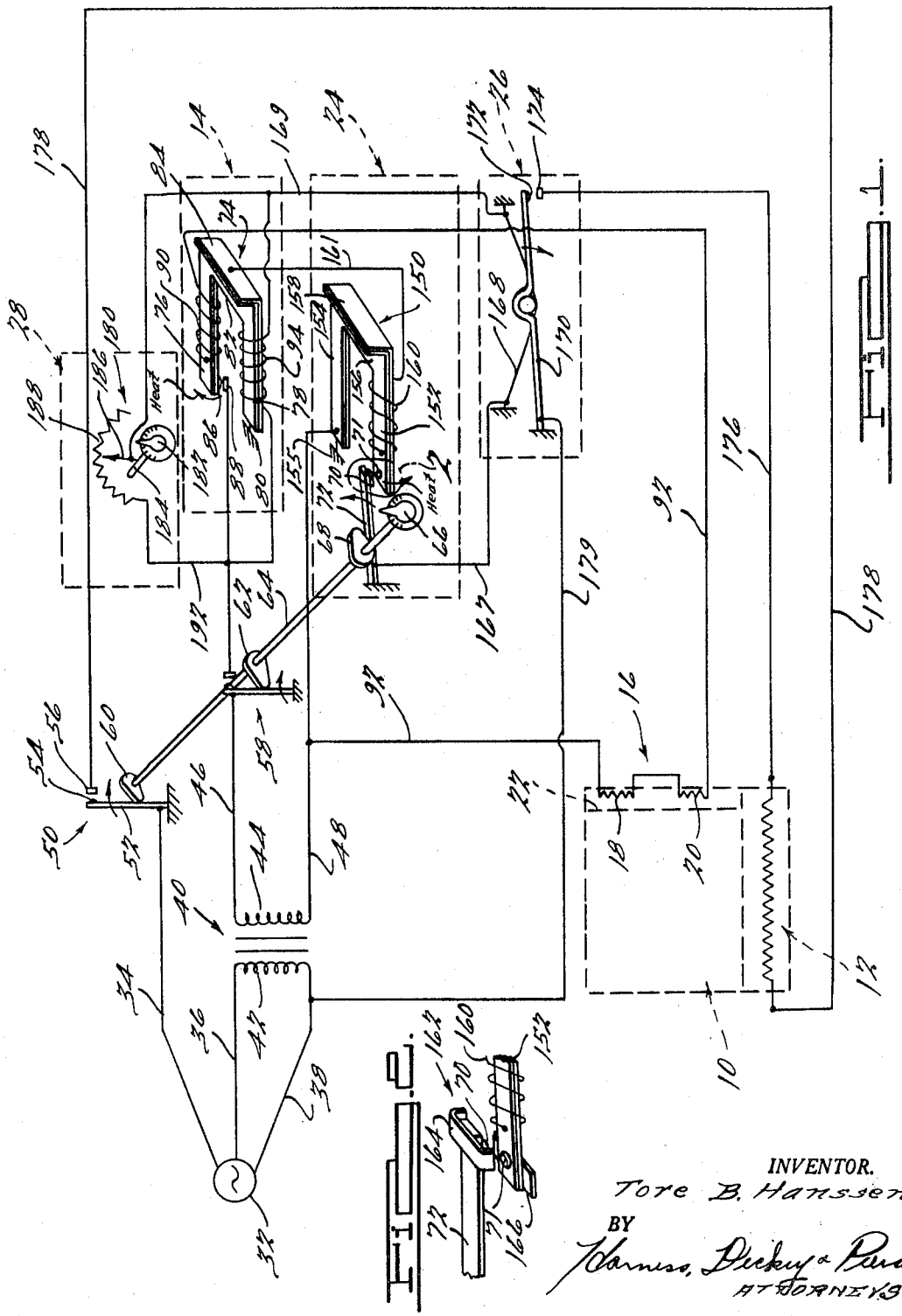

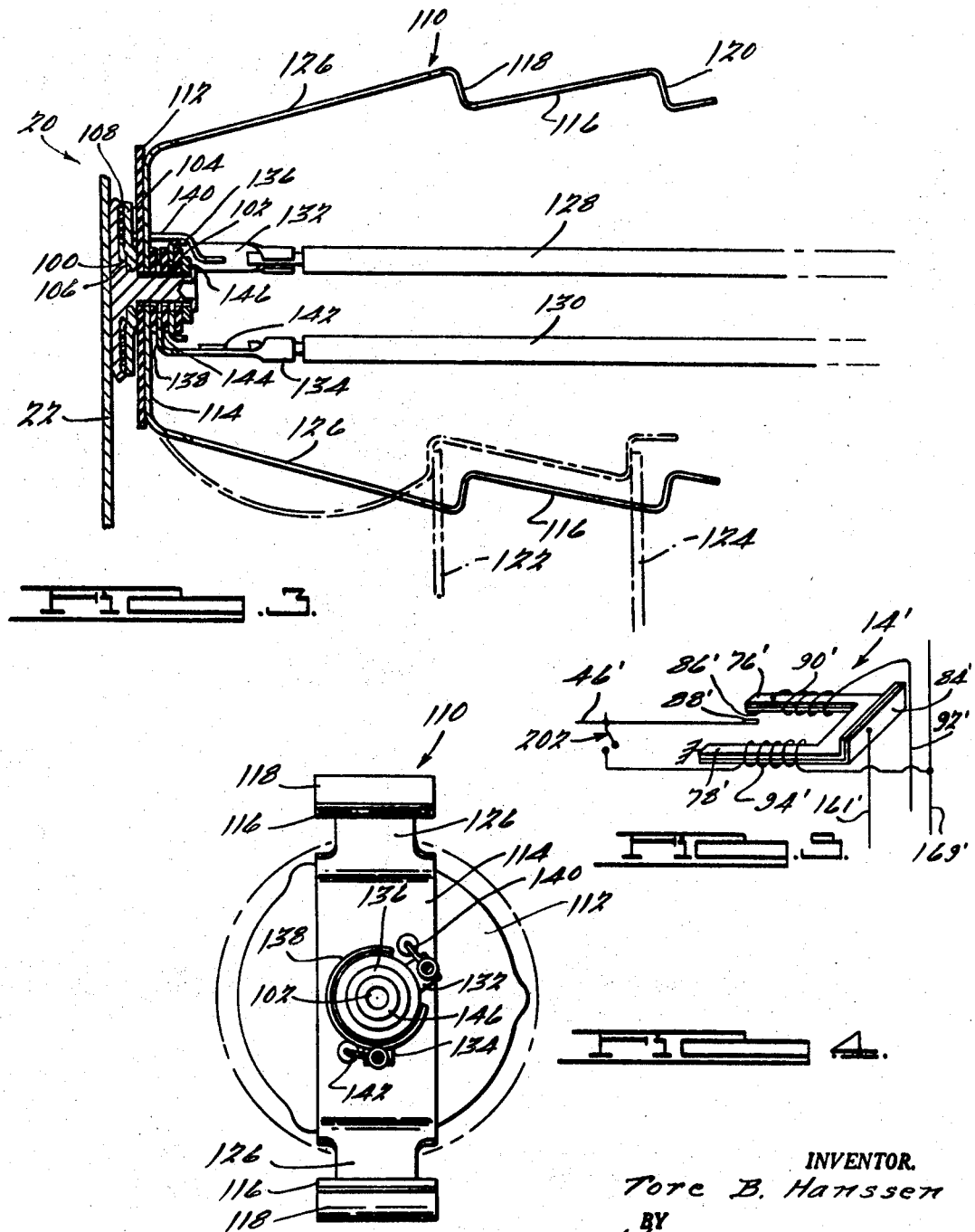

3,467,308
ELECTRIC HEATING OVEN WITH BROWNING CONTROL
Tore B. Hanssen, Ann Arbor, Mich., assignor to King-Seeley Thermos Co., Ann Arbor, Mich., a corporation of Michigan
Filed Nov. 7, 1962, Ser. No. 235,933
Int. Cl. A21b *1/40;* G05d *23/24*
U.S. Cl. 236—15                                   10 Claims

ABSTRACT OF THE DISCLOSURE

An oven temperature controller with plural heat integrating sensors and with means for changing the periodic peak temperatures in the oven with any selected average temperature for browning control.

---

This invention relates to temperature controlling systems and more particularly to apparatus including a plurality of temperature sensors for controlling the operation of a heater to obtain varying levels of heat output therefrom.

Heretofore, in controlling the temperature of an environment, it has been desirable to provide a temperature controlling system which includes electro-responsive means which will control the energization of a heater in accordance with the temperature of an environment as determined by a sensing element disposed in heat transfer relationship with the environment so as to maintain the oven at one of a plurality of preselected temperatures. In such cases the peak temperatures attained in the environment are normally substantially constant for a given preselected temperature and, furthermore, do not vary substantially from the preselected temperature throughout the heating period. Such temperature controlling systems are often used to control the temperature of a volume such as an oven cavity in a domestic range, stove or the like, at one of a plurality of preselected temperatures at which a certain food will be uniformly cooked to a desired degree of doneness.

In some cases, however, in order to achieve a desired browning effect on the exterior of food being cooked in the heated oven environment, it is desirable that the peak temperatures in the oven be momentarily or periodically adjusted without causing the average temperature of the environment to vary from the preselected temperature.

Furthermore, in controlling the temperature of such an oven cavity by means of a temperature sensing element in heat exchange relationship with the oven cavity, it is desirable that the sensing element detect the average heating effect of convective, radiant and conductive heat sources therein.

Therefore, the primary objects of this invention are to improve heat control means for maintaining the temperature of a space, such as an oven having a source of heat therefor, at a preselected temperature; to improve such heat control means by including means in operative association therewith which momentarily or periodically vary the peak temperatures within the space without significantly changing the average temperature in the space; and to include means for varying such peak temperatures which are selectively adjustable to produce a substantial range of peak temperatures without affecting the average temperature in the space.

Further objects of the invention are to control the temperature of an oven by sensing the average heating effect of a source of heat therefor by biasing senser means against the exterior surface of an inner wall of the oven; to control the temperature of an oven by arranging dual sensers in heat transfer relationship with different portions thereof which act conjointly in combination with electro-responsive means to control the heat output of means for heating the oven; and to provide dual sensers for achieving such control which include a first senser having a high temperature coefficient of resistance in circuit with a second senser having a high temperature coefficient of resistance both of which are in heat transfer relationship with first and second spaced portions of the oven, respectively.

The nature of the invention and its objects and features will become more apparent from a consideration of the following detailed description of the invention when read with reference to the accompanying drawings in which:

FIGURE 1 is a schematic diagram of a system embodying the principles of the present invention;

FIGURE 2 is an enlarged view of area 2 in FIGURE 1;

FIGURE 3 is a view in vertical section of a senser in heat transfer relationship with the exterior surface of an inner wall of an oven structure;

FIGURE 4 is an end view of the senser arrangement illustrated in FIGURE 3; and

FIGURE 5 is a schematic diagram of a modification of a portion of the system illustrated in FIGURE 1.

Referring first to FIGURE 1 of the drawings, the improved temperature-responsive system is shown associated with a heated environment, for example, an oven cavity 10 in a stove, range or the like, heated by heater means 12, representatively illustrated as an electrical resistance element in heat transfer relationship with the oven cavity. The temperature-responsive system controls the heat input into the oven cavity 10 by selectively energizing the heater means 12. Broadly, the temperature-responsive system includes a pulser 14 which establishes an effective voltage in the system which varies in accordance with temperatures sensed by senser means 16 comprising dual temperature sensers 18, 20 which are in intimate heat transfer contact with the exterior surface of an inner wall 22 of the oven 10. The pulser unit 14 controls a responder unit 24 which in turn controls a hot wire relay 26 to energize and deenergize the heater 12.

The system further comprises brownness control means 28 for selectively adjusting the peak temperatures in the oven without significantly changing an average temperature present therein.

More specifically, the temperature-responsive system is connected to a conventional 3-wire alternating voltage source 32 for applying alternating voltage to the heater 12 and the temperature-responsive system. It may be assumed, for example, that the source 32 is adapted to establish a 110-volt alternating voltage between conductors 34 and 36 and conductors 36 and 38, and to establish a 220-volt alternating voltage between the conductors 34 and 38.

A step-down transformer 40 for reducing the source voltage has a primary winding 42 connected between conductors 36 and 38 and a secondary winding 44 having conductors 46, 48 extending therefrom. A line switch 50 connected to the conductor 34 includes a cantilevered spring arm 52 having a contact 54 electrically and mechanically connected thereto which is movable with respect to a fixed contact 56 for opening and closing the heater circuit. An identical line switch 58 connects to the line 46 from the secondary winding 44 to open and close the temperature controlling circuit. Both of the line switches 50, 58 are normally spring-biased closed to energize the temperature-responsive system; however, cams 60, 62 mounted on a shaft 64 connected to a control knob 66 move the spring arm portions of the line switches 50, 58 to shift the movable contacts 54 open to deenergize the temperature-responsive system when the control knob 66 is moved to an "off" position. The control knob 66 is preferably graduated in degrees of temperature and as it is moved from the "off" position to a preselected temperature, a cam 68 and the shaft 64 deflects a spring arm 72 having a contact 70 electrically and mechanically connected thereto to move the contact 70 into engagement with a movable contact portion 71 of the responder unit 24 to initiate heating of the oven. Energization of the responder unit 24 will cause the movable contact 71 to move away from the contact 70 to interrupt such heating in a manner to maintain the oven at the preselected temperature established by the control knob 66.

When the line switches 50, 58 are closed and a temperature is selected on the control knob 66, the output voltage across the step-down transformer 40 appears between the conductors 46, 48 extending therefrom. This voltage is applied to the pulser unit 14 which includes a polymetallic element 74 having a pair of leg portions 76, 78 representatively illustrated as lying substantially in a common plane and extending in spaced parallelism with one another in that plane.

One end of the leg portion 78 is fixed to a reference surface in any suitable fashion as is indicated by the earthing symbol 80 (which does not connote electrical grounding) and the other end of the second leg portion 78 is joined to one end of the first leg portion 76 by means of a crosspiece 82. An upstanding flange 84 is provided to increase the stiffness of the crosspiece 82 to the point where the crosspiece will not deflect to any significant degree in response to the mechanical or thermal forces to which the unit is subjected. The other end of the first leg portion 76 carries an electrical contact 86, that contact being electrically as well as mechanically integral with the first leg portion. This contact is adapted to cooperate with a fixed contact 88, and the unit is constructed so that the contacts 86, 88 are in firm engagement with one another when the temperature differential between the leg portions 76, 78 is zero or substantially zero.

It will be appreciated that the provision of a U-shaped member of a nature shown will permit compensation of ambient temperature variations since the effect upon the position of the contact 86 of heating of the second leg portion 78 is the opposite of that produced by equal heating of the first leg portion 76.

Differential heating of the leg portions 76, 78 is accomplished by heating means in the form of a first heater winding 90 representatively disposed in heat transfer relationship with the first leg portion 76 and, more particularly, coiled around that leg portion. One end of the first heater winding 90 is electrically connected to the first leg portion 76 and the other end of that winding is connected to a conductor 92 leading therefrom which connects the sensors 18, 20 to the line 48 from the secondary winding 44. As a result, when the fixed and movable contacts 86, 88 are closed, the first heater winding 90 is connected across the secondary winding 44 of the transformer so that current flows through the fixed and movable contacts 86, 88 and through the first heater winding 90. The resultant heating of the first leg portion 76 causes the contact-carrying end of that portion to deflect upwardly in a direction to separate the fixed and movable contacts 86, 88.

When the contacts are separated, the energizing circuit for the heater winding 90 is interrupted and the first leg portion 76 commences to cool, deflecting in a direction to bring the movable contact 86 into reengagement with the fixed contact 88 to close the energizing circuit for the heater winding 90. The movable leg portion 76 continues to deflect upwardly and downwardly with a small amplitude motion which is of lower frequency than the frequency of the source 32. As a result, the average wattage input to a load circuit or device connected between the polymetallic element 74 and the conductor 48 will vary in accordance with the opening and closing rate of the contacts 86, 88.

More particularly, the pulser unit 14 functions to maintain the fixed and movable contacts 86, 88 in an incipient opening and closing state with the temperature of the movable leg portion 76 undulating about that temperature at which the fixed and movable contacts 86, 88 just close. Since the average rate of energy consumption of the heater winding 90 may, of course, be expressed in terms of watts ($E^2/R$) and since with relatively fixed radiating conditions the resistance of the heater winding 90 may be assumed to be substantially constant, it follows that the average voltage appearing across the winding 90 (as averaged over a series of the pulsations of pulser 14 after it has commenced to pulse) is substantially constant. For any given resistance value of the sensors 18, 20, it also necessarily follows that the average voltage appearing between the polymetallic element 74 and the conductor 48 is substantially constant.

In the illustrated arrangement the sensors 18 and 20 are selected to have a positive temperature coefficient of resistance so that as the temperature of the oven rises, the total resistance of the dual sensors 18, 20 also progressively rises. The increase in the total resistance of the dual sensors 18, 20 tends correspondingly to reduce the magnitude of the instantaneous current flow through (and the instantaneous voltage across) the heater winding 90 during the closed periods of contacts 86 and 88. Since the pulser 14 regulates the operation of contacts 86 and 88 in a manner to tend to maintain a constant average wattage input to, and average voltage across the heater winding 90, this decrease in the instantaneous current magnitude and voltage results in and is accompanied by an increase in the ratio between the closed and open periods of the contacts 86 and 88. Since the contacts 86, 88 are closed for a greater period of time, the average voltage between the polymetallic element 74 and the conductor 48 increases to control the responder 24 in a manner to be discussed.

A heating means illustrated in the form of a heater winding 94 is also provided for the leg portion 78 of the polymetallic element 74. Energization of the heater winding 94 heats the leg 78 to tend to deflect the contact 86 on the freely movable end of the leg portion 76 in a direction toward the contact 88. As a result, the temperature which the leg portion 76 must obtain in order to separate the contacts 86 and 88 is increased and the wattage dissipated in and the voltage across the winding 90 in order to maintain the contacts 86, 88 in the aforesaid condition of incipient opening and closing is increased. Consequently, the average output voltage of the pulser unit 14 is increased. Conversely, upon deenergization of the heater winding 94, the pulser unit 14 is restored to its normal operating characteristics and the output voltage therefrom decreases. The nature and purpose of winding 94 will be described in more detail hereafter.

The responder unit 24 comprises a U-shaped polymetallic element 150 which includes first and second legs 152, 154 located in spaced parallelism in substantially a common plane.

One end of the leg portion 154 is fixed to a reference surface in any suitable fashion as indicated by the earthing symbol 155 (which does not connote electrical grounding) and the other end of the first leg portion 152 is joined to one end of the second leg portion 154 by means of a crosspiece 156. An upstanding flange 158 is provided to stiffen the crosspiece 156 in the same manner as the flange portion 84 does in the pulser unit 14. The other end of the first leg portion 152 carries the electrical contact 71, that contact being electrically as well as mechanically integral therewith. The contact 71 cooperates with the adjustably fixed contact 70, and the unit is constructed so that the contacts 70, 71 are in firm engagement with one another when the temperature differential between the leg portions 152, 154 is zero or substantially zero. Ambient temperature compensation is produced in the responder unit 24 in the same manner as in the pulser unit 14.

Differential heating of the leg portions 152, 154 is accomplished by heating means in the form of a heater winding 160, representatively, disposed in heat transfer relationship with the first leg portion 152 and, more particularly, coiled around that leg portion. One end of the heater winding 160 is electrically connected to the first leg portion 152 and the other end thereof is connected to a conductor 161 leading therefrom which connects to the polymetallic element 74 of the pulser unit 14. The polymetallic element 150 of the responder 24 is also electrically connected to the conductor 48 at the anchored end of the second leg portion 154 thereof.

In the illustrated arrangement, the average wattage input to the heater winding 160 (corresponding to a given sensed temperature), at which the contacts 70, 71 of the responder 24 are opened or closed is adjusted in the illustrated arrangement, by moving the control knob 66 to a preselected temperature. This causes the cam 68 to deflect the spring arm 72 into engagement with the leg portion 152 of the responder 24 which is in turn biased to a predetermined extent. It will be appreciated that the position of the leg portion 152 determines the amount of heat induced deflection (produced by energization of heater winding 160) required to produce separation of the contacts 70, 71 and hence determines the magnitude of the average wattage input to the winding 160 required to produce such deflection.

In the illustrated arrangement, it is preferred that snap-acting means be provided for the responder 24 in order to establish a spread or differential between that temperature of the leg portion 152 at which the contacts 70, 71 will open and that temperature at which such contacts will close and hence a spread or differential between the average wattage input to the winding 160 which is required to produce separation of the contacts 70, 71 and a reduced average wattage input to the winding 160 at which the contacts 70, 71 will be permitted to reengage each other for any given setting of the control knob 66. In the illustrated arrangement, such snap-acting means takes the form of a magnetic circuit 162 which is best illustrated in FIGURE 2 as comprising a permanent magnet 164 secured to the spring arm 72 by suitable fastening means. The magnet 164 cooperates with an armature 166 secured on the underside of the free end of the polymetallic leg portion 152 to restrain separation of the contacts 70, 71 and to produce a snap closure thereof.

For example, in response to an increase in the average wattage input to the heater winding 160, the polymetallic leg portion 152 will deflect in a direction to separate the contact 71 from the contact 70. This separation is inhibited by the magnetic attraction between the armature 166 and the magnet 164. However, when the average wattage input to the heater winding 160 rises to a predetermined level the contacts 70 and 71 will abruptly separate. If thereafter the average wattage input to the winding 160 is reduced, i.e., the sensed temperature is reduced, the temperature of the leg portion 152 is lowered and the contact 71 will be moved by the leg portion 152 toward the contact 70. When the contact 71 is in a selected degree of proximity to the contact 70, the magnetic attraction between the permanent magnet 164 and the armature 166 produces a rapid snap closure of the contacts 70, 71. The difference between the sensed temperature at which the contacts 70, 71 open and the sensed temperature at which the contacts close is the spread or differential produced by the magnetic circuit 162.

The circuit further includes the hot wire relay 26 which, more particularly, comprises an elongated wire 168 having a finite resistance and a substantial coefficient of thermal expansion. The opposite ends of the wire 168 are anchored with respect to suitable fixed support means and a portion of the wire intermediate such anchored ends is mechanically coupled to a cantilevered spring arm 170 of electrically conductive material.

One end of the wire 168 is electrically connected to the spring arm 72 by means of a conductor 167 and the opposite end thereof is electrically connected by means of a conductor 169 to the pulser unit heater winding 94 and the brownness control 28 to be described.

The wire 168 restrains the spring arm 170 against a bias therein which moves a contact 172 on the freely movable end thereof toward a fixed contact 174 which is electrically connected by a conductor 176 to the heater 12 which is in turn electrically connected by a conductor 178 to the line switch 50 and conductor 34. A conductor 179 electrically connects the spring arm 170 to the conductor 38. The above described relay device serves the function of controlling the energization of the heater 12 (which is or may be a high current-consuming element) to maintain the oven cavity 10 at a uniform temperature as set by the control knob 66.

It will be appreciated the use of the illustrated hot wire relay 26 is not an essential element of the invention and that it could be replaced by means such as a solenoid valve for controlling the flow of gas to a gas heater which may be substituted for the illustrated electrical heater 12 for heating the oven cavity 10. In such a case, the responder unit 24 will control the solenoid valve in a conventional manner to vary the gas flow to a gas heater so as to control the temperature of the oven 10.

The control system illustrated in FIGURE 1 of the drawings is, or may be, in certain aspects, similar to the control system disclosed in application Ser. No. 773,286, filed Nov. 12, 1958 (now Patent 3,069,524 granted Dec. 18, 1962) of Tore Hanssen for Electro-Responsive Heating System, the disclosure of which is hereby incorporated by reference as fully as if that disclosure had been explicitly disclosed herein.

The system illustrated in FIGURE 1 will first be generally described under the assumption that the brownness control means 28 is set so that the heater winding 94 of the pulser unit 14 is ineffective. One embodiment of brownness control means 28 for rendering the winding 94 ineffective comprises a manually actuatable device or controller 180 which includes a rotatable indicator knob 182 connected to a shaft 184 which has a contact-carrying arm 186 connected to which is operatively associated with a resistor 188. By rotating the shaft 184 of the controller 180 counterclockwise to a substantial degree, the magnitude of the resistor 188 connected in shunt of winding 94 may be reduced until the winding 94 is substantially fully shunted through conductors 190, 192 which connect the controller 180 to conductors 169, 46 respectively.

It will, therefore, be seen that the system (without the heater winding 94) operates thermostatically with the contacts 70, 71 of the responder unit 24 closing to produce energization of the heater means 12 whenever the sensed temperature, as detected by the senser means 16, falls below one preselected value and with the contacts 70, 71 opening to produce deenergization of the heater means 12, whenever the sensed temperature rises above another preselected value. If there is no snap-acting means for the responder 24 (such as the magnetic circuit 162), the sensed temperature at which the contacts 70, 71 open and the sensed temperature at which those contacts close (for a given setting of knob 66), may be the same or essentially the same. However, in the illustrated and preferred arrangement, in which snap-acting means such as magnetic circuit 162 is provided, there will be a spread between those two temperatures so that the temperature of the oven cavity 10 will undulate about the temperature set by the control knob 66. The magnitudes of the swings of the oven temperature will, of course, normally be greater than the difference between sensed temperature at which the responder contacts 70, 71 close and their sensed temperature at which said contacts open, since there is normally some overshoot in the system. For example, the heater means 12, despite deenergization, will be at a temperature well above that of the oven cavity 10 and will continue for a period of time to transfer heat to the oven cavity so that the oven temperature thereof will continue to rise for a time. Similarly, the heater means 12 cannot instantly develop a predetermined peak temperature in response to energization thereof and, accordingly, some delay will be occasioned between the time of energization of the heater means 12 and the time at which the oven cavity begins to be heated in response thereto and during that time the oven cavity may continue to cool. Hence, for any selected spread between the two sensed temperatures at which the heater means 12 will be energized and deenergized, the temperature of the oven cavity 10 will tend to undulate over an even greater range of temperatures. In other words, when the heater winding 94 is ineffective, the peaks and valleys of the temperature in the oven cavity 10 may be substantial even though the average temperature in the oven cavity 10 is maintained substantially constant.

By rotating the shaft 184 of the controller 180 clockwise to a substantial degree, the magnitude of the resistor 188 connected in shunt of the winding 94 may be rendered so large as to effectively nullify the shunting effect thereof so that the winding 94 is rendered fully effective. Under this condition, the energizing circuit for the wire 168 includes not only the contacts 70, 71, but also the winding 94 (the resistor 188 in parallel therewith being so large as to be ineffective to reduce the effect of the winding 94). Under this condition, the winding 94 is connected in circuit with the wire 168 and will thereby be energized each time that the contacts 70, 71 of the responder unit 24 are closed and will be deenergized each time that those contacts are open. Energization of the winding 94 results in heat output therefrom which elevates the temperature of the polymetallic leg 78 of the pulser unit 14 causing a deflection therein which will move the contact 86 thereof toward the contact 88. The effect of such heating is in opposition to the effect of raising the temperature of the polymetallic leg portion 76 (by means of the heater winding 90), and is similar to that which would be produced if the resistance of the heater winding 90 were increased upon closure of the contacts 86, 88.

This reduction in the temperature differential in the leg portions 76, 78 results in an increase in current through the heater winding 90 and the senser means 16 since additional wattage has to be dissipated by the heater winding 90 to raise the temperature of the polymetallic leg portion 76 to the point where the contacts 86, 88 will again be in a condition of incipient opening and closing. The increased current through the serially interconnected heater winding 90 and senser means 16 produces an increased voltage drop between the conductor 46 and the conductor 48 and hence a like voltage drop between conductors 161 and 48, and as a result an increased voltage is developed across the winding 160 of the responder 24. This increase in voltage results in an increased wattage dissipation by the heater winding 160 and an elevation of the temperature of the polymetallic leg portion 152, tending to separate the contacts 70, 71.

The magnitude of the increased voltage between the conductors 161, 48 may be selected primarily by selecting the resistance value of the winding 94 so as to reduce the sensed temperature to which the senser means 16 must rise before the contacts 70, 71 are open. For example, the winding 94 may be selected so that closure of contacts 70, 71 will produce an energization of winding 94 which will cause the voltage between conductors 161 and 48 to rise to a sufficient value to elevate the temperature of leg portion 152 to a point where contacts 70, 71 will become separated even though the sensed temperature remains constant. Upon opening of contacts 70, 71, winding 94 is deenergized and, after a delay period, the voltage between conductors 161, 48 will fall, polymetallic leg portion 152 will cool, and contacts 70, 71 will again close even though the sensed temperature has not been reduced. In this manner, pulsing energization of the heater 12 is achieved, the heater 12 being energized and deenergized even though there is no change in sensed temperature.

Since the magnitude of the voltage between conductors 161 and 48 when winding 94 is deenergized is controlled primarily by the value of the senser means 16, and since the magnitude of that voltage when winding 94 is energized is controlled conjointly by the value of the senser means 16 and the heat output of the winding 94, the proportion of closed to open (of contacts 70, 71) or energized or deenergized time (of heater 12) will be controlled by the sensed temperature.

In this mode of operation, the temperature of the oven cavity 10 will undulate but minorly about the control temperature (as set by control knob 66) and optimum results are achieved in the cooking of most foods. However, this mode of operation of the control system, while optimum for most foods, has not proved, in practice, to be entirely satisfactory for certain foods, that is, for those foods which should be browned in order to present the most appetizing appearance. It has been discovered that while the best and most uniform cooking of substantially any food placed with the oven cavity 10 may be accomplished with the uniform temperature which may be achieved by the use of the control system hereinbefore described, the browned or toasted appearance which is important to the appetizing appearance of many foods is achieved only if the temperature in the cavity 10 is at least momentarily or periodically raised well above that temperature at which the best cooking is achieved. Consequently, in recognition of that discovery, means have been provided in the present system for selectively changing or adjusting the peak temperatures which are attained within the oven cavity 10 without, in the preferred arrangement, significantly changing the average temperature within that cavity. This means includes the manually actuatable device 180.

The effectiveness of winding 94, at any designed "maximum" position of manually actuatable device 180 (the position assumed when the shaft 184 thereof is rotated in a clockwise direction as far as it will go), may be selected either to provide (1) a type of operation in which the state of contacts 70, 71, and hence the state of energization or deenergization of heater 12, is changed only in response to a change of the sensed temperature, but with a reduced magnitude of change or differential of the sensed temperatures being required to produce that change of state or, (2) a fully pulsing or proportionate operation in which contacts 70 and 71, and hence main heater 12, repetitively change state independently of any change of the sensed temperature but, normally and preferably, with the sensed temperature controlling the proportion of closed to open time of contacts 70, 71 and thereby controlling the energized to deenergized time of heater 12.

Under that mode of operation in which the state of contacts 70 and 71 and the state of energization of heater 12 does not change in the absence of a change of sensed temperature, the manually actuatable device 180 serves to control the magnitude of the spread between the sensed temperature at which contacts 70 and 71 will open and the sensed temperature at which those contacts will close so that by the selective positioning of controller 180, the magnitudes of the swings or undulations of the temperature within the cavity 10 about the preselected temperature (as set by knob 66) may be selected by setting controller 180 to a relatively counterclockwise position, so that foods which should desirably be browned may be subjected to a temperature environment which periodically achieves relatively high values. Foods which do not require browning for an appetizing appearance may be maintained at the same preselected temperature by setting the controller 180 in its clockwise or "maximum" position so that the temperature in the oven cavity 10 will not undulate about the preselected temperature to any substantial degree.

Under the second mode of operation, in which the energization of the heater 12, over a period of time, is proportioned in accordance with the temperature sensed by the senser means 16, the frequency with which the heater 12 is energized and deenergized may be reduced by rotating the controller 180 in a counterclockwise sense, thereby automatically increasing the magnitude of the undulations of the temperature within the oven cavity 10 about a given preselected temperature setting of control knob 66 to obtain a desired brownness effect, whereas by rotating the controller 180 in a clockwise sense, the magnitude of those undulations may be decreased so as to provide optimum operation for those foods in which browning is not necessarily a desirable characteristic.

As a third and preferred mode of operation of the manually adjustable device or controller 180, the system is arranged so that at a relatively clockwise position of the controller, winding 94 is sufficiently effective to produce a pulsing or proportionate operation in which a change of state of the contacts 70 and 71 and a change of the energized or deenergized condition of the heater 12 is not conditioned upon a change of sensed temperature but rather occurs repetitively independently of any change of sensed temperature (but with an "on-off" ratio proportioned to the sensed temperature). As controller 180 is rotated in a counterclockwise sense, the frequency of this pulsating energization of the heater 12 is reduced and if the controller 180 is moved sufficiently in a counterclockwise sense, the winding 94 becomes insufficiently effective to overcome the temperature spread induced in the responder 24 by the snap-acting means so that the system is converted from pulsing or proportionate operation (in which the state of energization or deenergization of the main heater 12 is repetitively changed independently of any change of sensed temperature but in which the percentage of energization of the main heater, over a time, is proportioned in accordance with the sensed temperature) to thermostatic operation, (in which the state of contacts 70 and 71 and the state of energization or deenergization of the heater 12 can be changed only in response to a change of the sensed temperature). In the latter operation, undulations of the temperature within the oven cavity 10, about the selected temperature (as set by control knob 66) occur with the transient, periodic peak or maximum temperatures being sufficient, though not continuous, to produce the desired browning effect even though the average temperature in the volume 10, over a period of time, has not been significantly changed.

Another example of an arrangement which produces the preferred mode of operation is illustrated in FIGURE 5 as an "on-off" brownness control which comprises a switch 202 which replaces the controller 180. When the switch 202 is closed, current will pass through a heater winding 94 which may be proportioned to produce a deflection in the polymetallic leg 78' of a pulser unit 14' which will cause a contact 86' to move toward a contact 88' sufficiently to produce the pulsating operation of the control system as discussed above. The primed elements in this arrangement are counterparts of the same unprimed elements discussed in the system of FIGURE 1 and are adapted to be included in a system such as that illustrated in FIGURE 1.

In this arrangement, when undulations of oven cavity temperature about a preset control temperature are required for a desired browning of food, the switch 202 is opened to terminate the heating action of the heater winding 94'. Consequently, the contacts 86', 88' are no longer moved into engagement and the average wattage input to a responder unit is controlled strictly in accordance with the temperatures sensed by suitable senser means, so as to produce a system which operates thermostatically with the substantial undulations in oven temperature required for a desired browning of food in an oven cavity controlled by such an "on-off" device.

In accordance with certain of the principles of the present invention, the sensing means 16 comprising the pair of sensers 18 and 20 are so electrically interrelated that they compositely or conjointly control the operation of other elements of the system. The location of such temperature sensers in the oven cavity depends in part on the nature and pattern of convective, conductive and radiant heat sources therein. It is desirable that the senser be located to detect the average heating effect of such heat sources. However, it has been found that the convective heat pattern in an oven interior will vary considerably depending on the heat output from means in heat transfer relationship therewith. Furthermore, the radiation heat sensed by a temperature senser in an oven will vary to a greater or lesser degree depending on the disposition of cooking utensils in the oven cavity since such utensils often block off the direct passage of radiation rays to the temperature sensers. For example, a flat cookie sheet might completely block all radiation rays passing from a bottom heater in a conventional oven arrangement to a temperature senser located in an upper portion of the oven. Additionally, the heat pattern in an oven arrangement will often be distorted if the oven door is temporarily opened during the cooking process. In such cases a blast of cold air will alter the convective pattern in the oven to a considerable degree.

The inner wall of an oven, however, has a substantial surface area which acts to integrate the conductive, convective and radiant heat patterns in an oven to reflect an averaged temperature therein. Therefore, in accordance with certain of the concepts of the present invention, sensing means, such as the dual sensers 18, 20 are located in intimate heat transfer contact with the outer surface of the wall 22 at spaced locations thereon. For example, it has been found that a dual senser arrangement having one senser 18 located adjacent the top portion of the wall 22 and another senser 20 located adjacent the lower portion thereof will effectively reflect the influence of variable convective, conductive and radiant heat patterns within an oven.

In the illustrated embodiment, the inner wall 22 is heated by the heater 12 which is located in the bottom of the oven 10. Consequently, the lower portion of the inner wall 22 will be relatively hotter than the upper portion thereof. Therefore, the senser 20 which is located in heat transfer relationship with the lower portion of the inner wall 22 has a smaller resistance value than that of the senser 18 in order to weight the temperature differential in the inner wall 22 resulting from the bottom location of the heater 12. More particularly, in one working embodiment of an oven having such a bottom heater, the ratio of the resistance of the sensers 18 and 20 was approximately three to one. On the other hand, in cases where there is a top and bottom heater which will conjointly heat all portions of the inner wall 22 to substantially the same temperature, the sensers might be, for example, substantially of equal resistance. In other words, the ratio of the resistances of such dual sensers depends on the arrangement of the oven heaters and the location of the sensers relative thereto, it being understood that the resistance of such sensers will be proportioned in a manner to weight the temperature of different portions of the inner wall 22 so as to reflect the average environmental temperature of the oven space.

One embodiment of a senser constructed in accordance with certain other concepts of the invention to sense the temperature of a portion of the inner wall 22 as illustrated in FIGURES 3 and 4 as including a button portion 100 having an arbor 102 projecting rearwardly therefrom which carries a backing plate 104 in axial abutment with a shoulder portion 106 on the button 100. The backing plate 104 is suitably fastened on the arbor 102 by staking or the like.

The shoulder portion 106 spaces the button 100 from the backing plate 104 a distance equal to the diameter of an insulated wire having a high temperature coefficient of resistance which is wound about the arbor 102 between the button 100 and the backing plate 104. The button 100 and backing plate 104 are preferably of a soft metal having a high coefficient of heat transfer such as aluminum, which will rapidly respond to temperature variations. Furthermore, the use of such a soft metal enables the wire 108 to be firmly embedded in the inner surfaces of the button 100 and the backing plate 104 in order to obtain an intimate heat transfer contact therebetween so that the wire 108 quickly responds to temperature variations in the button 100 and the backing plate 104.

The outer surface of the button 100 is located in heat transfer relation with a flat surface such as the inner wall 22 of the oven 10 by a supporting bracket 110 and a support plate 112 of electrical insulating material which is concentrically disposed on the arbor 102 in axial abutment with the outer surface of the backing plate 104. The contact area of the button 100 is large in comparison with the thermal mass of the unit so that the unit will sense very small changes in the temperature of wall 22. In other words, the resistance of the wire 108 will closely follow temperature variations of the oven. The bracket 110 includes a bight portion 114 which engages the support plate 112 and end portions which connect to spaced arms 116 which are directed rearwardly of the wall 22. Each arm 116 has shoulder portions 118, 120 which engage the outer wall of an oven, range or the like. For example, the shoulder portions 118 will engage an outer wall 122 which is spaced a first distance from a rear wall such as the wall 22 of the oven 10 or the shoulder portions 120 will engage an outer wall 124 which is spaced a second distance from such an inner wall. In other words, the supporting bracket 110 adapts the senser unit for use in different sized ovens. Each arm 116 further includes a forwardly located thin neck portion 126 which is flexed or bowed outwardly to bias the button 100 against the inner wall 22 when the shoulder portions 118, 120 are in engagement with the outer wall of an oven as shown in dotted lines in FIGURE 3.

The ends 140, 142 of the resistance wire 108 of the senser unit are electrically connected to conductors 128, 130 (which are adapted to be electrically connected in circuit with other portions of a control system such as that illustrated in FIGURE 1) by means including bus bars 132, 134 which are secured to the arbor 102 by discs 136, 138, respectively. A washer 144 of electrical insulating material is secured on the arbor 102 between the bus bar mounting discs 136, 138 for electrically insulating therebetween. Similar washers electrically insulate the bight portion 114 of the supporting bracket 110 and a washer 146 carried on the ends of the arbor 102 from the mounting discs 138, 136, respectively. The end of the arbor 102 is deformed to securely fasten the washer 146 thereon in axial engagement with its adjacent insulating washer for holding the mounting discs, support bracket and support plate thereon.

While it will be apparent that the embodiments of the invention herein disclosed are well calculated to fulfill the objects of the invention, it will be appreciated that the invention is susceptible to modification, variation and change without departing from the proper scope of fair meaning of the subjoined claims.

What is claimed is:

1. In a system for cooking a variety of foods including foods which should be desirably browned and including a volume in which the food may be heated and a heater for heating that volume, the combination of a temperature sensing device disposed in heat transfer relation with the volume, and a controller for controlling the energization of the heater comprising settable means for preselecting the average temperature at which the volume shall be maintained, control means controlled by said sensing device and by said settable means for repetitively energizing and deenergizing the heater to maintain the volume at the preselected average temperature, said control means including a pair of electrical contacts the state of which is changed between open and closed states to control the energization of the heater, and compensating means controlled by said electrical contacts for changing the response of said control means to said temperature sensing device, and selectively actuatable means controlling said control for selectively changing the magnitude of the temperature changes within the volume about said preselected average temperature comprising means for changing the effectiveness of said compensating means.

2. In a system for cooking a variety of foods including foods which should be desirably browned and including a volume in which the food may be heated and a heater for heating that volume, the combination of a temperature sensing device disposed in heat transfer relation with the volume and a controller for controlling the energization of the heater comprising settable means for preselecting the average temperature at which the volume shall be maintained, control means controlled by said sensing device and by said settable means for repetitive energizing and deenergizing the heater only in response to changes of the sensed temperature to maintain the volume at the preselected average temperature, said control means including a pair of electrical contacts the state of which is changed between open and closed states to control the energization of the heater, and compensating means controlled by said electrical contacts for changing the response of said control means to said temperature sensing device, and selectively actuatable means controlling said control means for selectively changing the magnitude of the temperature changes within the volume about said preselected average temperature comprising means for changing the effectiveness of said compensating means.

3. In a system for cooking a variety of foods including foods which should be desirably browned and including a volume in which the food may be heated and a heater for heating said volume, the combination of a temperature sensing device disposed in heat transfer relation with the volume, and a controller for controlling the energization of the heater comprising settable means for preselecting the average temperature at which the volume shall be maintained, control means controlled by said sensing device and by said settable means for repetitively energizing and deenergizing the heater in response to changes of the sensed temperature of a first preselected magnitude to maintain the volume at the preselected average temperature, said control means including a pair of electrical contacts the state of which is changed between open and closed states to control the energization of the heater, and compensating means controlled by said electrical contacts for changing the response of said control means to said temperature sensing device, and selectively actuatable means controlling said control means for selectively changing the magnitude of said preselected temperature changes within the volume from said preselected temperature while maintaining the volume at said preselected average temperature comprising means for changing the effectiveness of said compensating means.

4. In a system for cooking a variety of foods including foods which should be desirably browned and including a volume in which the food may be heated and a heater for heating that volume, the combination of a temperature sensing device disposed in heat transfer relation with the volume, and a controller for controlling the energization of the heater comprising settable means for preselecting the average temperature at which the volume shall be maintained, control means for repetitively energizing and deenergizing the heater independently of any change of the sensed temperature to maintain the volume at the preselected average temperature, and means for controlling the proportion of energized to deenergized time of the heater in accordance with the sensed temperature to maintain the volume at said preselected average temperature, and selectively actuatable means controlling said control means for selectively changing the magnitude of the temperature changes within the volume about said preselected average temperature including means for changing the frequency of the repetitive energizing and deenergizing of the heater independently of changes in the sensed temperature.

5. In a system for cooking a variety of foods including foods which should be desirably browned and including a volume in which the food may be heated and a heater for heating that volume, the combination of a temperature sensing device disposed in heat transfer relation with the volume, and a controller for controlling the energization of the heater comprising settable means for preselecting the average temperature at which the volume shall be maintained, control means for repetitively energizing and deenergizing the heater independently of any change of the sensed temperature to maintain the volume at the preselected temperature, and means for controlling the proportion of energized to deenergized time of the heater in accordance with the sensed temperature to maintain the volume at said preselected average temperature, and selectively actuatable means controlling said control means for selectively changing the magnitude of the temperature changes within the volume about said preselected average temperature including a rheostat for changing the frequency of the repetitive energizing and deenergizing of the heater independently of changes in the sensed temperature.

6. In a system for cooking a variety of foods including foods which should be desirably browned and including a volume in which the food may be heated, and a heater for heating that volume, the combination of a temperature sensing device disposed in heat transfer relation with the volume, and a controller for controlling the energization of the heater comprising settable means for preselecting the average temperature at which the volume shall be maintained, control means controlled by said sensing device and by said settable means for repetitively energizing and deenergizing the heater to maintain the volume at the preselected average temperature independently of any change of the sensed temperature and means for controlling the proportion of energized to deenergized time of the heater in accordance with the sensed temperature to maintain the volume at said preselected average temperature, and selectively actuatable means for selectively changing the magnitude of the temperature changes within the volume about said preselected average temperature including means including said control means for energizing and deenergizing the heat only in response to changes in the temperature of the volume.

7. A domestic oven comprising a cabinet having walls defining an oven cavity, heating means for said cavity, circuit control means for said heating means selectably operable to control the heating means to effect various cooking operations, temperature control means for said heating means settable to control the heating means to hold a selected temperature, said temperature control means comprising a pair of vertically spaced external temperature sensors in heat transfer relation with the outer surface of the oven walls, each sensor having an electrical resistance in series connection with the other, a voltage regulating relay connected with the series resistances of the sensors so that the sensors vary the effective output voltage of said relay in accordance with the sensed temperature of the cavity walls, a responder relay receiving the effected output voltage of the voltage regulator, and an output relay controlled by the responder relay for controlling the output of the heating means, the external temperature sensors serving to control the temperature of the oven walls thereby controlling the temperature within the oven cavity.

8. A cooking apparatus comprising an outer cabinet and inner walls defining an oven cavity having a front access door, heating means for said cavity, a source of electrical current for energizing the heating means, switch means for said said heating means selectably operable to control the heating means to effect various cooking operations, and temperature control means for said heating means settable to control the heating means to hold a selected temperature; said invention comprising a temperature control means having a pair of vertically spaced external temperature sensors in heat transfer relation with the outer surface of the walls of the oven cavity, each sensor having an electrical resistance in series connection with the other, a voltage regulating relay connected to the said sensors so that the sensors vary the effective output voltage of said relay in accordance with the sensed temperature of the oven walls, a responder relay receiving the effective output voltage of the voltage regulator, and an output relay controlled by a responder relay for controlling the output of the heating means.

9. A domestic oven comprising a cabinet having walls defining an oven cavity, heating means for said cavity, circuit control means for said heating means selectably operable to control the heating means to effect various cooking operations, temperature control means for said heating means settable to control the heating means to hold a selected temperature, said temperature control means comprising a pair of vertically spaced external temperature sensors in heat transfer relation with the outer surface of the oven walls, each sensor being joined with the other so as to average out the effect of each sensor, the sensors being connected to a thermostatic device so that the combined effect of the dual sensors may be transmitted to the thermostat for obtaining more uniform temperatures for the walls of the oven.

10. In a control means for an oven or a like volume in which an object is raised from a lower to a higher temperature by a heater for heating the volume, the combination of a sheet of conductive material having an inner surface in heat transfer relationship with the volume for integrating the temperatures of convective heat sources therein, first and second senser elements located in heat transfer relationship with spaced points on the exterior surface of said sheet, means including said sheet for shielding said first and second sensers from direct contact with convective currents in the volume, each of said elements having electrical characteristics which vary with the temperature thereof, means operative in response to the combined electrical characteristics of said senser elements for controlling the heater for maintaining the volume at a preselected average temperature, and a controller for controlling the energization of the heater comprising settable means for preselecting the average temperature at which the volume shall be maintained, control means controlled by said senser elements and by said settable means for repetitively energizing and deenergizing the heater to maintain the volume at the preselected average temperature, and selectively actuatable means controlling said control means for selectively changing the magnitude of the temperature changes within the volume about said preselected average temperature.

References Cited

UNITED STATES PATENTS

| | | | |
|---|---|---|---|
| 3,051,814 | 8/1962 | Bergsma | 219—20.4 |
| 3,069,524 | 12/1962 | Hanssen | 219—20.4 |
| 2,157,296 | 5/1939 | Muntz. | |
| 2,307,636 | 1/1943 | Newell. | |
| 1,703,803 | 2/1929 | Widstrom | 236—1 |
| 1,743,073 | 1/1930 | Simmons | 200—138 |
| 2,110,674 | 3/1938 | Miller et al. | |
| 2,273,734 | 2/1942 | Pearce | 236—78 |
| 2,544,031 | 3/1951 | Kyle | 236—68 X |
| 2,556,973 | 6/1951 | Nickells. | |

(Other references on following page)

UNITED STATES PATENTS

| | | |
|---|---|---|
| 2,838,644 | 6/1958 | Rolfson et al. |
| 2,015,838 | 10/1935 | Borden et al. _____ 73—341 |
| 2,565,350 | 8/1951 | Burns et al. _____ 236—15 |
| 2,606,986 | 8/1952 | Sweger. |
| 2,641,667 | 6/1953 | Shivers _____ 200—137 |
| 2,691,889 | 10/1954 | Dion et al. _____ 73—342 |
| 2,761,052 | 8/1956 | Knudson _____ 236—78 X |
| 2,797,291 | 6/1957 | Davis _____ 219—20 |
| 2,848,894 | 8/1958 | Pappas _____ 73—343 |
| 3,112,880 | 12/1963 | Pollock _____ 73—341 X |
| 2,970,201 | 1/1961 | Woodward. |
| 3,088,016 | 4/1963 | Mertler et al. _____ 338—25 X |
| 3,176,118 | 3/1965 | Scott. |

WILLIAM E. WAYNER, Primary Examiner.

U.S. Cl. X.R.

73—342; 99—100; 219—413; 236—68, 78

UNITED STATES PATENT OFFICE
CERTIFICATE OF CORRECTION

Patent No. 3,467,308                                        September 16, 1969

Tore B. Hanssen

It is certified that error appears in the above identified patent and that said Letters Patent are hereby corrected as shown below:

Column 10, line 24, after "convective" insert -- heat --; line 67, "as" should read -- is --. Column 12, line 42, "said" should read -- that --; line 49, after "temperature" insert -- from the preselected average temperature --; line 58, "the magnitude of said preselected" should read -- said preselected magnitude of the --. Column 14, line 4, cancel "said", second occurrence.

Signed and sealed this 27th day of October 1970.

(SEAL)
Attest:

Edward M. Fletcher, Jr.
Attesting Officer

WILLIAM E. SCHUYLER, JR.
                                                   Commissioner of Patents